US006996081B1

(12) United States Patent
Brouwer

(10) Patent No.: US 6,996,081 B1
(45) Date of Patent: Feb. 7, 2006

(54) RESOURCE CAPACITY REPORTING TO CONTROL NODE OF RADIO ACCESS NETWORK

(75) Inventor: Frank Brouwer, GA Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 924 days.

(21) Appl. No.: 09/680,265

(22) Filed: Oct. 5, 2000

(51) Int. Cl.
*H04B 7/216* (2006.01)

(52) U.S. Cl. .................. 370/335; 370/252; 370/253; 370/254; 370/328; 370/341; 370/342

(58) Field of Classification Search ........ 370/252–254, 370/328, 335, 341, 342
See application file for complete search history.

(56) References Cited

U.S. PATENT DOCUMENTS

| 6,011,800 | A | * | 1/2000 | Nadgauda et al. | 370/437 |
| 6,353,638 | B1 | * | 3/2002 | Hottinen et al. | 375/260 |
| 6,404,778 | B1 | * | 6/2002 | Hayashi et al. | 370/470 |
| 6,424,618 | B1 | * | 7/2002 | Uesugi et al. | 370/208 |
| 6,567,670 | B1 | * | 5/2003 | Petersson | 455/522 |
| 6,647,005 | B1 | * | 11/2003 | Cao et al. | 370/342 |
| 6,711,403 | B1 | * | 3/2004 | Herrmann et al. | 455/422.1 |
| 6,738,634 | B1 | * | 5/2004 | Shin | 455/466 |
| 2002/0049062 | A1 | * | 4/2002 | Petersen | 455/453 |
| 2003/0189900 | A1 | * | 10/2003 | Barany et al. | 370/229 |

FOREIGN PATENT DOCUMENTS

| DE | 197 41 700 A1 | 3/1999 |
| WO | 97/41698 | 11/1997 |

OTHER PUBLICATIONS

PCT, WO 00/49816, Code Allocation in Connection with Soft Handover in CDMA system.*
International Preliminary Examination Report mailed Nov. 28, 2002 in corresponding PCT application No. PCT/SE01/02178.
3GPP Technical Specification, 3G TS 25.433, V3.3.0 (Sep. 2000), 3rd Generation Partnership Project; Technical Specification Group Radio Access Network; UTRAN lub Interface NBAP Signaling (Release 1999), Sections §8.2.15 and §9.1.32, pp. 2, 38-40 and 103-107.
3GPP Technical Specification, 3G TS 25.433, V3.1.0 (Mar. 2000), 3rd Generational Partnership Project; Technical Specification Group Radio Access Network; UTRAN lub Interface NBAP Signalling (Release 1999), Sections §8.2.15 and §9.1.31.

* cited by examiner

*Primary Examiner*—Wellington Chin
*Assistant Examiner*—Kevin Mew
(74) *Attorney, Agent, or Firm*—Nixon & Vanderhye, P.C.

(57) ABSTRACT

A base station node (28) of a radio access network determines a number of connections that can be added for each of plural spreading factors to the base station node, and sends to a radio network controller (RNC) node (26) a capacity indication (110) including the determined number of connections. In a first message mode of the invention, the capacity indication is included in a conventional 3GPP "Resource Status Indication" message, while in a second message mode the capacity indication is included in a separate supplemental message known as the capacity message. To prepare the capacity indication, the base station tracks actual usage of base station resources for determining the number of connections that can be added to the base station node, and assesses the capability of the base station node to add new connections.

22 Claims, 13 Drawing Sheets

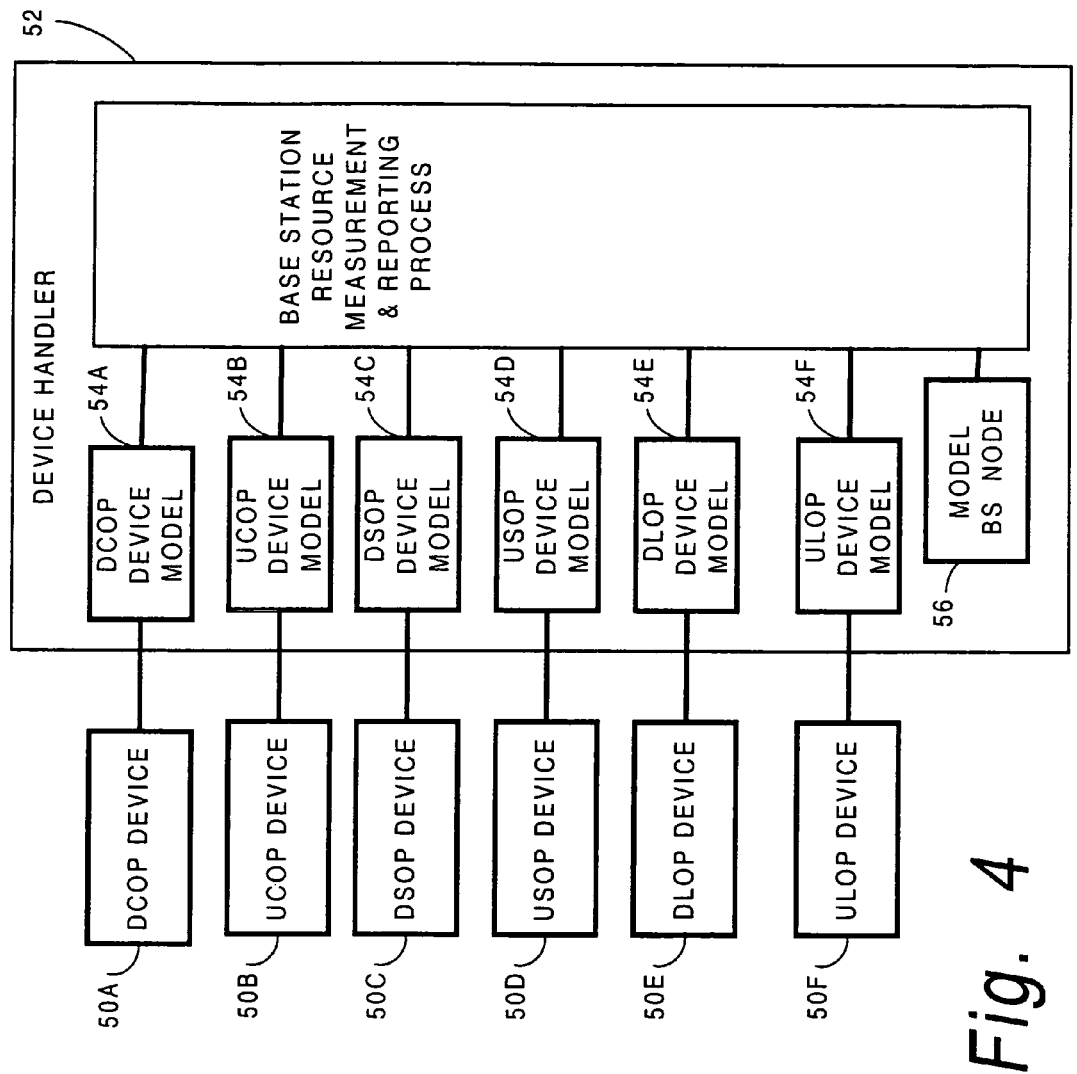

RESOURCE CAPACITY REPORTING TO CONTROL NODE OF RADIO ACCESS NETWORK

BACKGROUND

1. Field of the Invention

The present invention pertains to wireless telecommunications, and particularly to acquisition of status information by a control node of a radio access network.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks).

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations. Some of the hardware at the base stations can take the form of devices which are mounted on "boards" such as circuit boards.

Ideally an RNC attempts to manage UTRAN resources as efficiently as possible, thereby providing the greatest possible capacity (e.g., the largest number of possible connections between users) while maintaining an expected/desired quality for each connection. But in order to manage efficiently, the RNC must have fairly accurate and complete information about the services being carried by the UTRAN and the load in the portions of the network controlled by the RNC. This means that information about the load of a base station controlled by the RNC must be communicated to the RNC.

It would be impractical to communicate continuously the exact load situation in a given base station to its controlling RNC. To communicate the exact load situation, all status information for all hardware elements, e.g., boards, comprising the base station would have to be transmitted or transferred over the Iub interface to the RNC which manages the base station. Communication of such extensive load information would undersireably congest the Iub interface.

In recognition of the need to balance reporting of base station resource loading with efficient use of the Iub interface, a "Resource Status Indication" message has been proposed in Third Generation Partnership Project (3GPP) Specification 25.433 "UTRAN Iub Interface NBAP Signalling". The Third Generation Partnership Project (3GPP) has undertaken to evolve further the UTRAN and GSM-based radio access network technologies. The "Resource Status Indication" message, described, e.g., in the Third Generation Partnership Project (3GPP) Specification 25.433§8.2.15 and §9.1.31, is sent from a base station node (e.g., "Node B") to its controlling RNC upon occurrence of specific events, and contains some approximating information regarding usage of hardware resources. The information reported by the base station in the "Resource Status Indication" message is generally expressed in terms of so-called "Consumption Laws". These laws indicate the amount of resources utilized for a connection given the spreading factor (SF) of the connection. The RNC then estimates the amount of resources being utilized at the base station by adding up the resource usage of each individual connection, taking this consumption law into account.

The proposed 3GPP "Resource Status Indication" message has deficiencies. Some of these deficiencies are rooted in the fact that the load on the base station node cannot always be expressed as a sum of the resource usage of each individual connection. As a first example deficiency, fragmentation problems at the base station node may render the sum misleading. Fragmentation can occur, for example, in a multi-board base station node in which spare capacity is scattered in an unusable fashion over several boards. In other words, while the sum contemplated by the 3GPP "Resource Status Indication" message may imply a certain spare capacity, not all the spare capacity is usable in view of the fragmentation.

To illustrate the problem of fragmentation, suppose that there are a number of the same boards in a base station and three classes of connections exist, particularly connection classes A, B, and C. Further suppose that each of the three boards can handle either of the following: (1) three class A connections; (2) two class B connections; (3) one class C connection or a class A connection and a class B connection. Thus, in terms of Consumption laws, A=1; B=1.5, and C=3. A correct load value for the base station can be found when all connections are the same class, but when the connections are of mixed classes, the sum does not hold. When several boards have mixed class allocations like this, more resources seem to be free than actually is the case.

A second example deficiency is that the sum reported by the 3GPP "Resource Status Indication" message may not be accurate when more than one resource type is used for a connection. Suppose, for sake of illustration, that there are two kinds of boards involved in a connection. A first kind of board (board type P) uses one circuit per connection regardless of the spreading factor (e.g., board type P can carry ten connections). The use of resources on a second type of board (board type Q), however, depends on the spreading factor of the connections on the board. Suppose that board type Q has twenty circuits. Suppose further that connection class A uses one circuit each, and connection class B uses four circuits each. Table 1 shows maximum combinations under either of two consumption laws (the first consumption law being A=2, B=2; the second consumption law being A=1, B=4). From Table 1 it can be seen that using the first consumption law will work when many of the class A connections are in the system, while the second consumption law will work when many class B connections are in the system.

TABLE 1

| Maximum Combinations | First Consumption Law A = 2, B = 2, limit = 20 | Second Consumption Law A = 1, B = 4, limit = 20 |
| --- | --- | --- |
| 10xA + 0Xb | 20 | 10 |
| 9xA + 1Xb | 20 | 13 |
| 8xA + 2Xb | 20 | 16 |
| 7xA + 3Xb | 20 | 19 |
| 4xA + 4Xb | 16 | 20 |

What is needed, therefore, and an object of the present invention, is a technique for providing more accurate information regarding the load on a base station node in a radio access network.

BRIEF SUMMARY

A base station node of a radio access network determines a number of connections that can be added for each of plural spreading factors to the base station node, and sends to a radio network controller (RNC) node a capacity indication based on the determined number of connections. In a first message mode of the invention, the capacity indication is included in a conventional 3GPP "Resource Status Indication" message, while in a second message mode the capacity indication is included in a separate supplemental message known as the capacity message. Preferably the capacity indication supplements information from the base station node to the radio network controller (RNC) node which merely reports, in terms of consumption laws, the usage of hardware resources at the base station node.

To prepare the capacity indication, the base station tracks actual usage of base station resources for determining the number of connections that can be added to the base station node, and assesses the capability of the base station node to add new connections. The new connection assessment takes into consideration any fragmentation issues or combinations of connection types occurring at the base station node, and therefore provides an accurate indication of the potential additional capacity of the base station node.

In either message mode, the capacity indication provides one or more capacity values to the radio network controller node. Whether the capacity indication is included in an RSI message or its own capacity message, the indication can be differently comprised according to various reporting cases or reporting modes of the present invention. In accordance with a first reporting mode of the invention, the 1 capacity indication is actually a vacancy capacity value, indicating the number of connections that can be added for each spreading factor. In this first reporting mode of the invention, the capacity indication includes a series of values which indicate how many allocations/connections of each possible spreading factor can be added before reaching the capacity limit. In accordance with a second reporting mode of the invention, the capacity indication is a total capacity value which reflects both the existing load and vacancy capacity over all spreading factors.

The base station node preferably has a processor which executes a base station resource measurement and reporting program in order to prepare and generate the capacity indication. The base station resource measurement and reporting program includes a device model object for various base station devices utilized in facilitating connections. By monitoring the device model objects, the base station resource measurement and reporting program ascertains an accurate calculation of the number of allocations/connections (Asf) of each possible spreading factor (sf) can be added before reaching the capacity limit.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a diagrammatic view showing various example devices located at a base station node.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
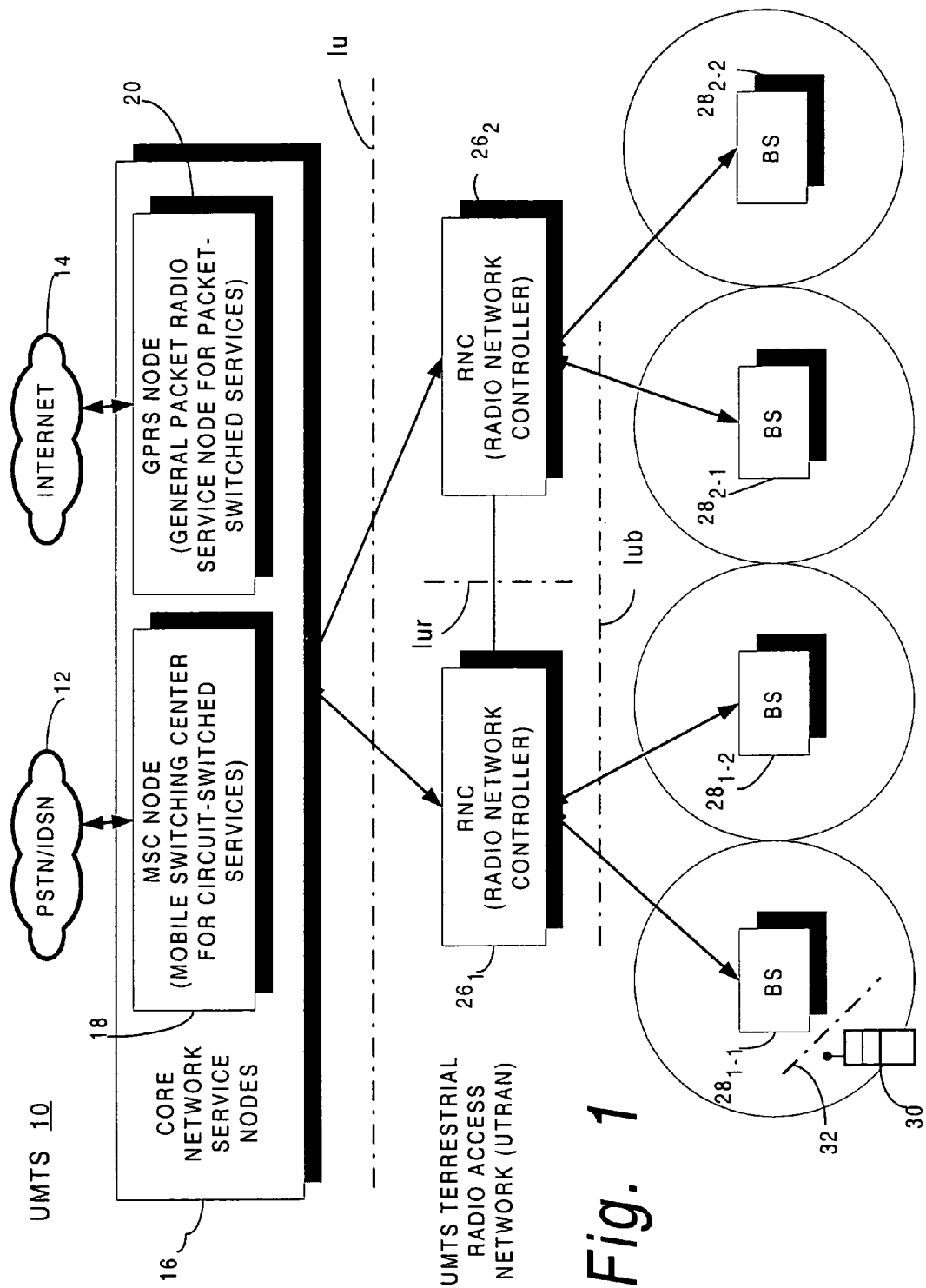
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC 26, and RNC 262. Each RNC 26 is connected to a plurality of base stations (BS) 28. For example, and again for sake of simplicity, two base station nodes are shown connected to each RNC 26. In this regard, RNC 26, serves base station $28_{1\text{-}2}$, and base station $28_{1\text{-}2}$, while RNC 262 serves base station $28_{2\text{-}1}$ and base station $28_{2\text{-}2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24. A user equipment unit (UE), such as user equipment unit (UE) 30 shown in FIG. 1, communicates with one or more base stations (BS) 28 over a radio or air interface 32. Each of the radio interface 32, the Iu interface, the Iub interface, and the Iur interface are shown by dash-dotted lines in FIG. 1.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30.

For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications.

As set up by the control channels, traffic channels (TCH) are allocated to carry substantive call communications with a user equipment unit (UE). Some of the traffic channels can be common traffic channels, while others of the traffic channels can be dedicated traffic channels (DCHs).

Figure 2:
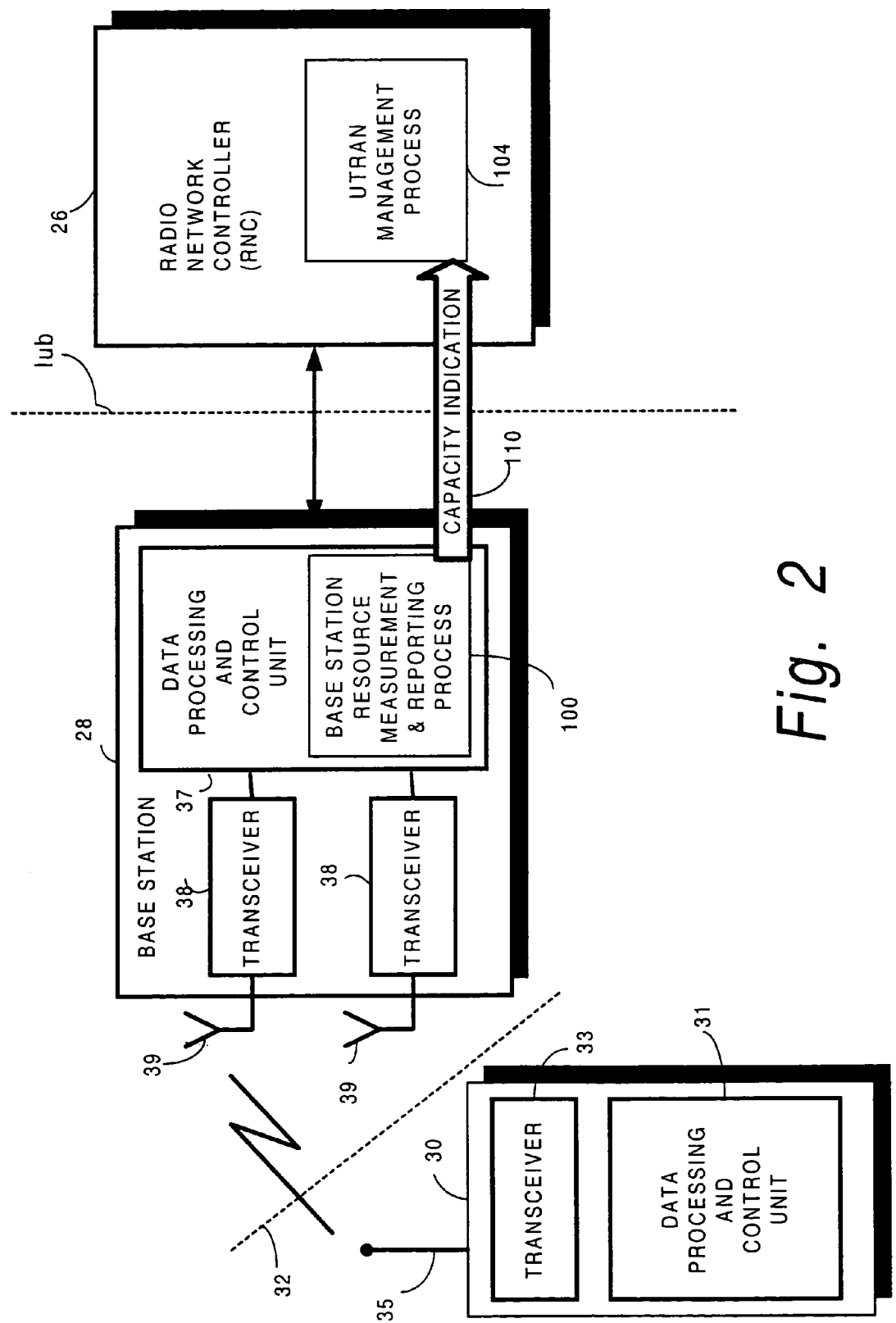
FIG. 2 is a simplified function block diagram of a portion of a UMTS Terrestrial Radio Access Network wherein a capacity indication is sent from a base station node to a radio network controller node.

FIG. 2 shows selected general aspects of user equipment unit (UE) 30 and illustrative nodes such as radio network controller 26 and base station 28. The user equipment unit (UE) 30 shown in FIG. 2 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 2 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In accordance with the present invention, the base station data processing and control unit 37 performs a base station resource measurement and reporting program 100. As generically shown in FIG. 2 and FIG. 3, the base station resource measurement and reporting program 100 sends, to a UTRAN management program 104 (executing at radio network controller (RNC) node 26), a node capacity indication 110 which is based on a number of connections that can be added for each of plural spreading factors. In a first message mode of the invention, the capacity indication 110 may be included in (e.g., appended to) a conventional 3GPP "Resource Status Indication" message (RSI message 102), while in a second message mode the capacity indication 110 is included in a separate supplemental message (herein illustrated as capacity message 112).

Figure 3:
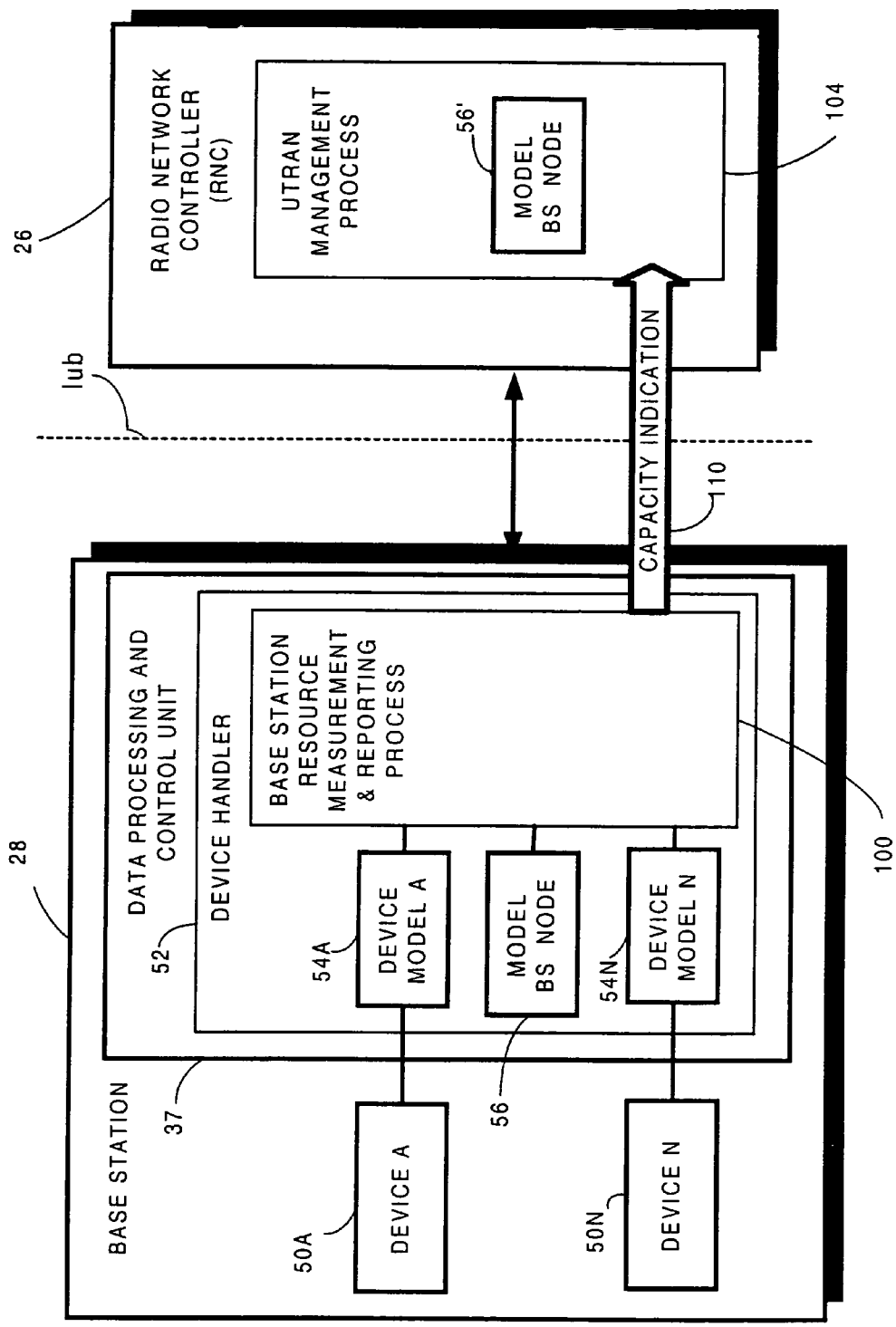
FIG. 3 is a schematic view showing certain aspects of a base station resource measurement and reporting process in context of a representative base station node and radio network controller, wherein a capacity indication is sent from a base station node to a radio network controller node.

FIG. 3 shows a simplified representative structure of a generic base station (BS) 28 for the sake of illustrating operation of base station resource measurement and reporting program 100. In view of its representative nature, base station (BS) 28 has various base station devices 50, depicted as devices 50A–50N in FIG. 3. Each device 50 needs to be allocated to radio links and/or radio link sets. The devices 50 are controlled by a device handler 52.

The types of devices 50 included at a base station can be several. Some of the devices 50 are of a type which are shared among plural users, and consequentially are not of particular interest to the present invention. Such shared devices include power amplifiers and low noise amplifiers, for example. Other devices 50 are of a type which are dedicated to one connection and are service dependent. These types of devices can generally be characterized as pertaining to coding and decoding, and include CRC handling, forward error correction, rate matching, interleaving, and radio frame segmentation. For these types of devices, the amount of resources required per connection is influenced by the service(s) carried by the connection, which has a strong relation to spreading factor. Yet other devices 50 are dedicated to one connection but are service independent. Examples of these devices are rate matching and mapping to physical channels, modulation/demodulation, and spreading/despreading. Unlike the service dependent devices, whether the connection is in softer handover or not is an issue for service independent devices, e.g., the number of spreaders relates directly to the number of cells occupied by a connection.

FIG. 4 provides some examples of the types of devices 50 which are handled by device handler 52 of base station (BS) node 28. Device 50A is a Downlink Cell Oriented Processing (DCOP) device which includes power amplification and scrambling. Device 50B is an Uplink Cell Oriented Processing (UCOP) device which includes low noise amplification and descrambling. Device 50C is a Downlink Service Oriented Processing (DSOP) device which includes CRC generation, FEC coding, rate matching, interleaving, and radio frame segmentation. Device 50D is an Uplink Service Oriented Processing (USOP) device which includes CRC generation, FEC decoding, rate matching, deinterleaving, and radio frame desegmentation. Device 50E is a Downlink Link Oriented Processing (DLOP) device which includes rate matching, mapping to physical channels, modulation, and spreading. Device 50F is an Uplink Link Oriented Processing (ULOP) device which includes rate matching, demodulation, and despreading. Although not illustrated as such in FIG. 4, it should be understood that a base station node may have one or more of each type of device 50.

For each device 50, base station resource measurement and reporting program 100 has a corresponding device model 52. In the illustrated embodiment, each device model 52 is a software object. In addition, base station resource measurement and reporting program 100 has a software object 56 which is a collection of data which serves to model base station (BS) 28, and which is therefore denominated as model BS node 56.

Figure 2A:
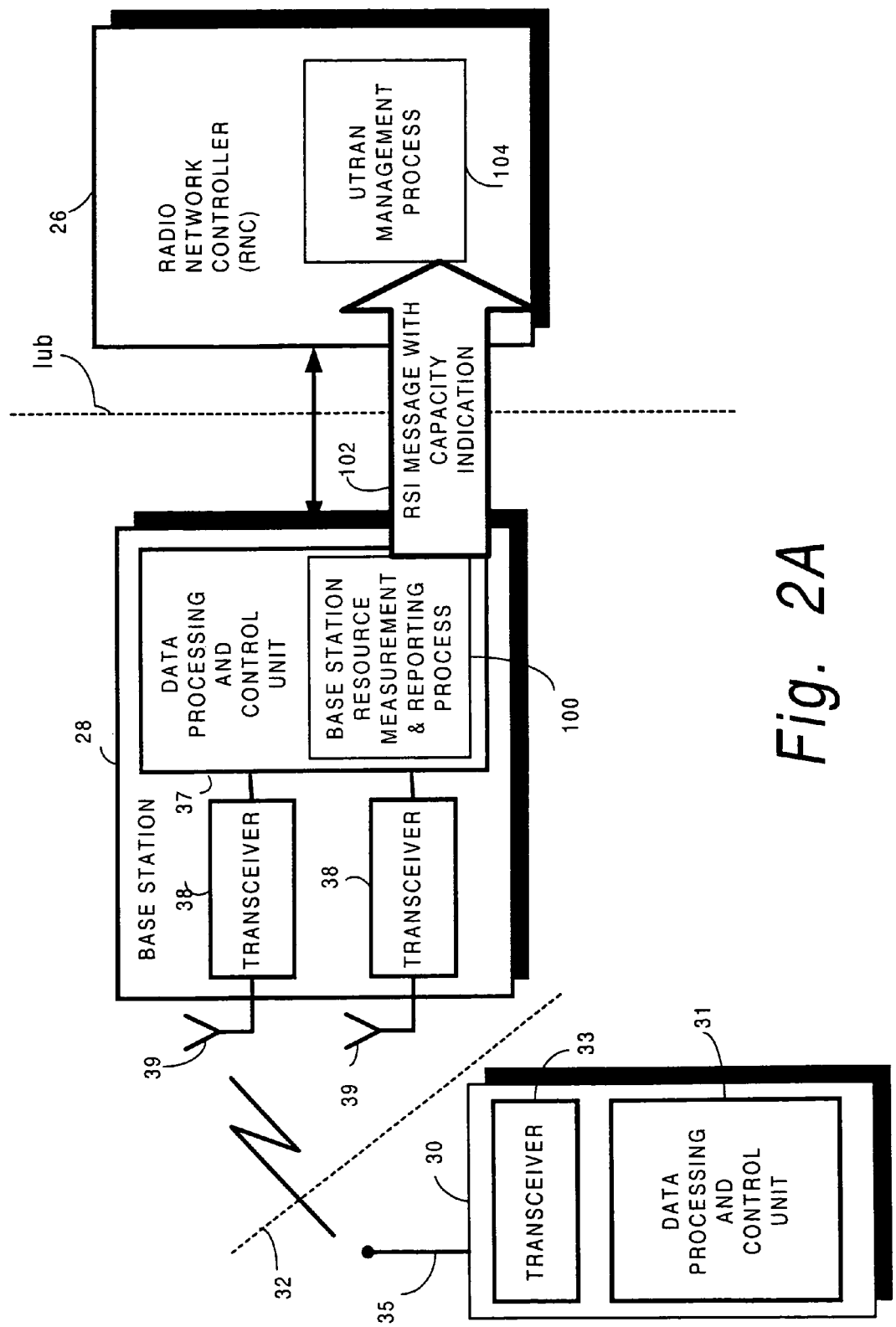
FIG. 2A is a simplified function block diagram of a portion of a UMTS Terrestrial Radio Access Network wherein a capacity indication is sent from a base station node to a radio network controller node in an augmented RSI message.
Figure 2B:
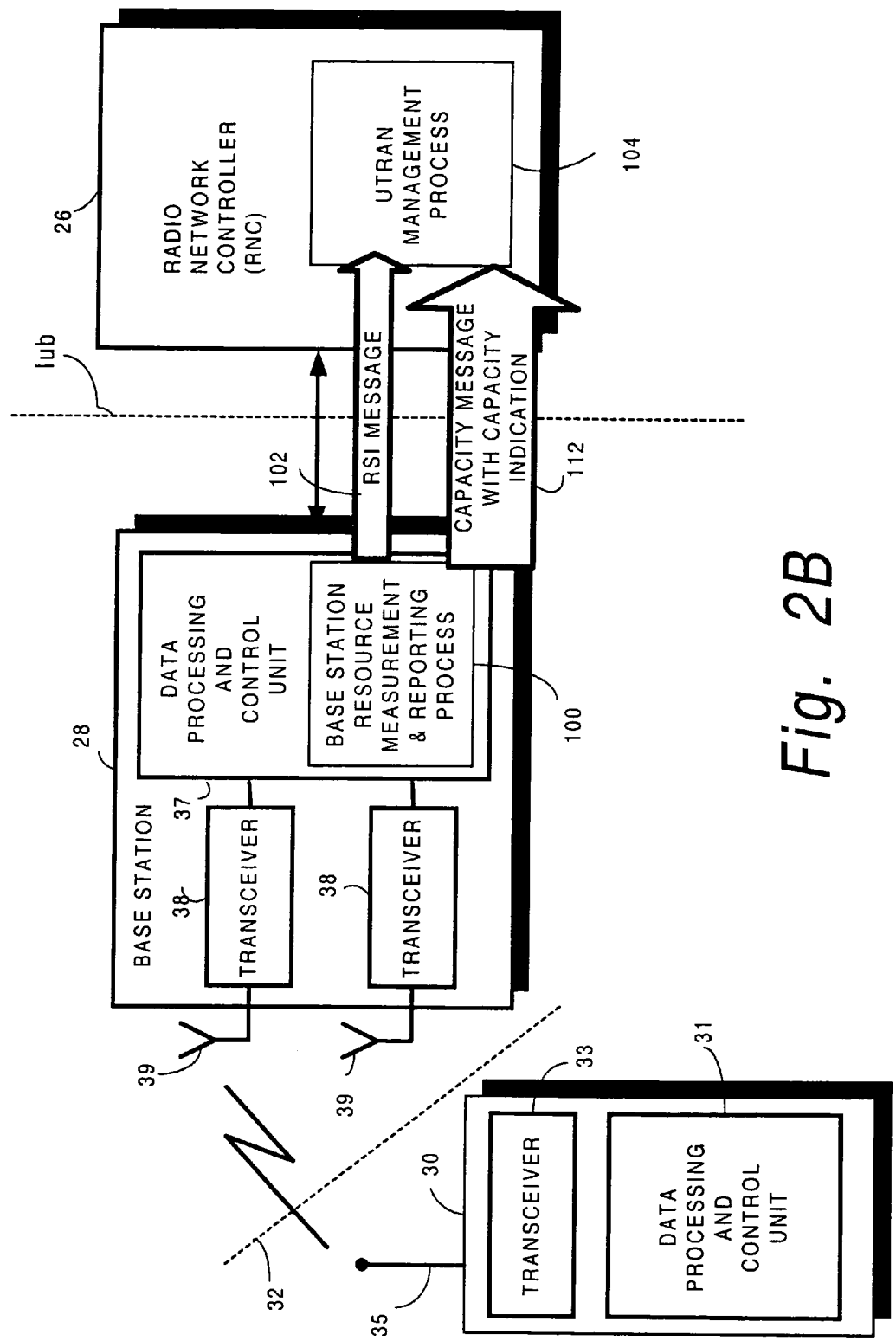
FIG. 2B is a simplified function block diagram of a portion of a UMTS Terrestrial Radio Access Network wherein a capacity indication is sent from a base station node to a radio network controller node in a separate capacity message.
Figure 3A:
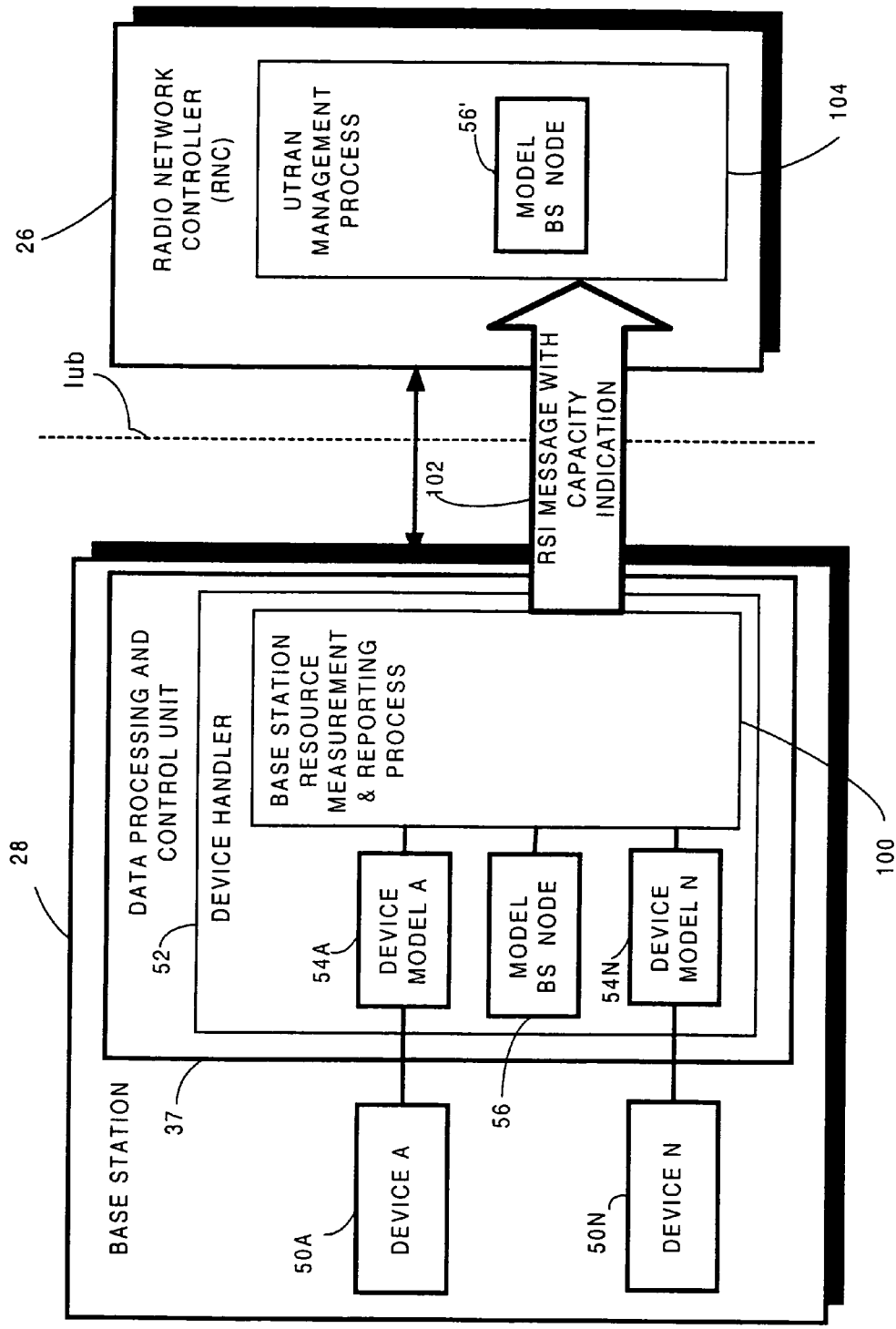
FIG. 3A is a schematic view showing certain aspects of a base station resource measurement and reporting process in context of a representative base station node and radio network controller, wherein a capacity indication is sent from a base station node to a radio network controller node in an augmented RSI message.
Figure 3B:
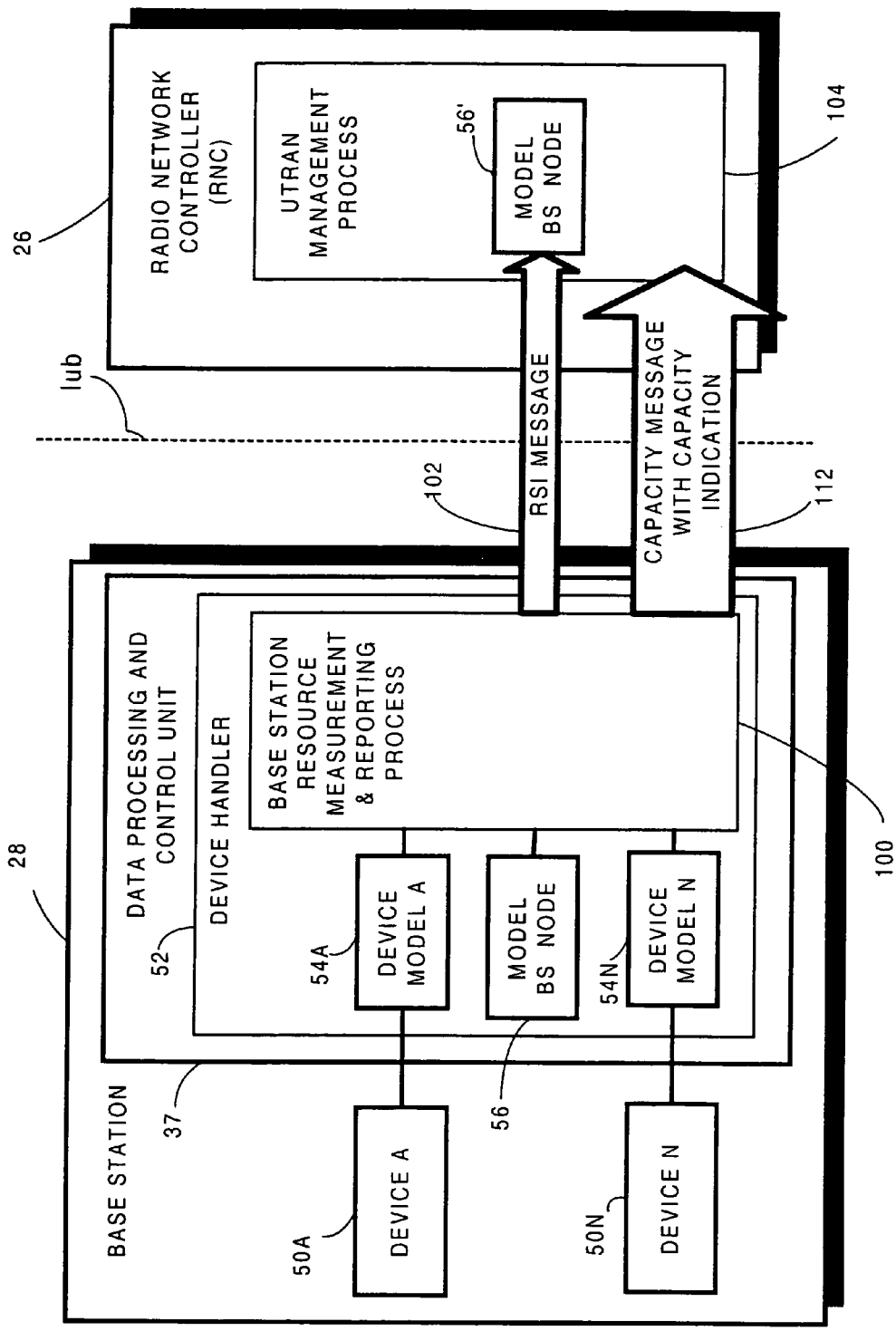
FIG. 3B is a schematic view showing certain aspects of a base station resource measurement and reporting process in context of a representative base station node and radio network controller, wherein a capacity indication is sent from a base station node to a radio network controller node in a separate capacity message.

The two message modes of the present invention are described as non-limiting examples of how a base station (BS) node 28 can send its capacity indication to a controlling node, such as to radio controller (RNC) node 26. In this regard, FIG. 2A, FIG. 3A, and FIG. 5A concern a first message mode of the invention in which the capacity indication is included in (e.g., appended to) a conventional 3GPP "Resource Status Indication" message (RSI message 102). FIG. 2B, FIG. 3B, and FIG. 5B concern another message mode of the invention in which the capacity indication is included in a capacity message 112 which is separate and distinct from the conventional 3GPP "Resource Status Indication" message (RSI message 102).

Figure 5A:
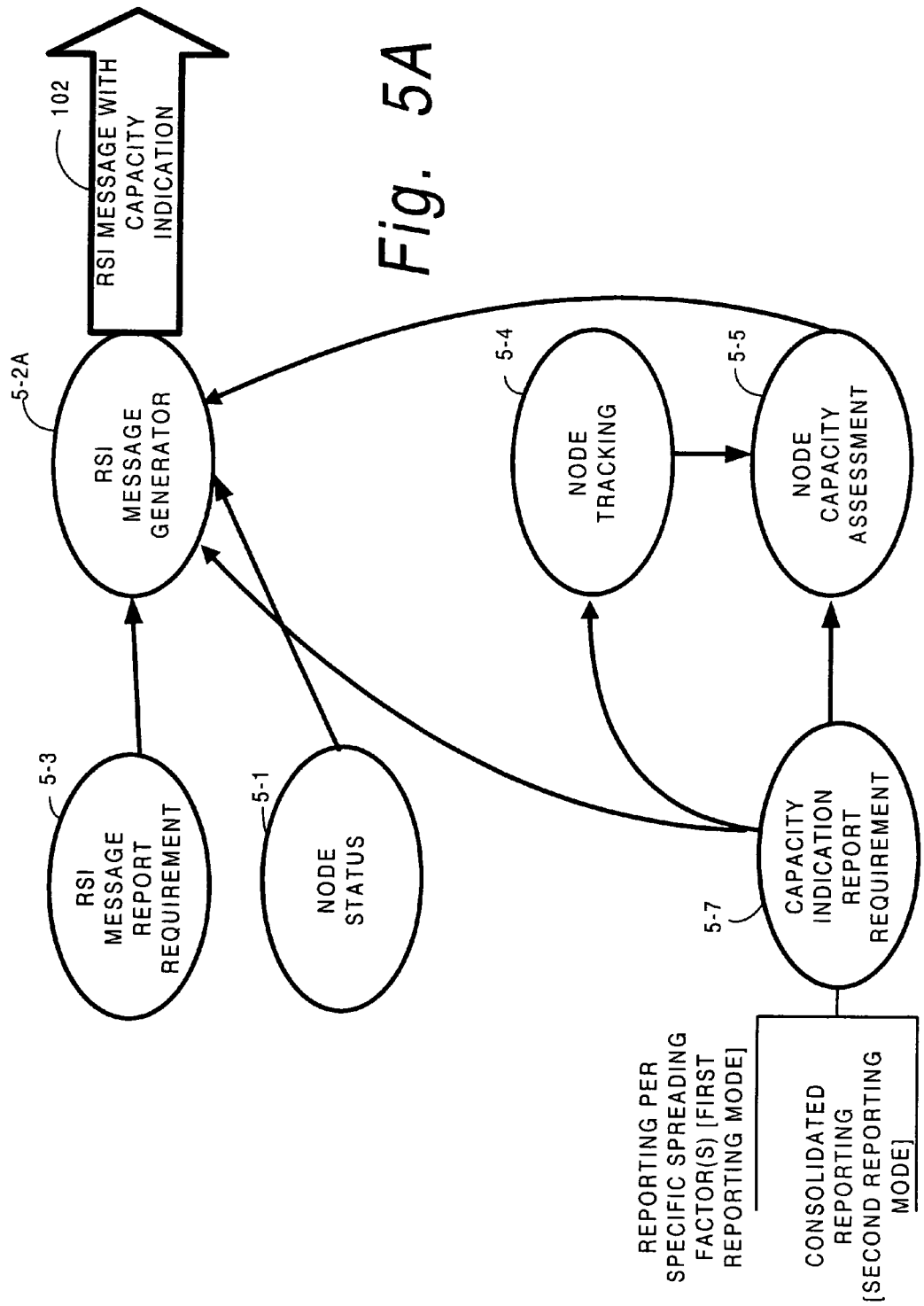
FIG. 5A is a diagrammatic view showing various processes included in a base station resource measurement and reporting program according to a mode of the invention wherein a capacity indication is sent from a base station node to a radio network controller node in an augmented RSI message.
Figure 5B:
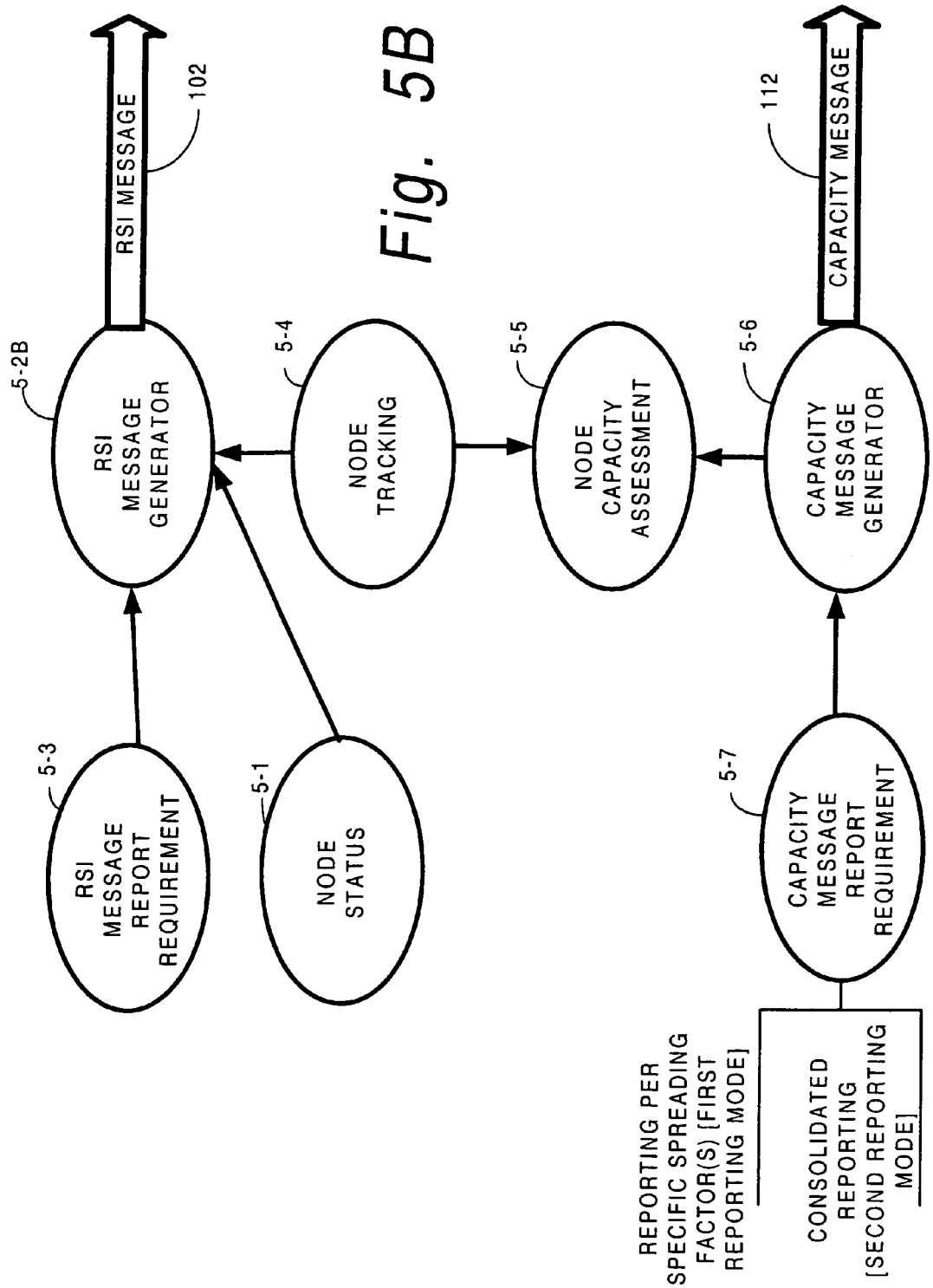
FIG. 5B is a diagrammatic view showing various processes included in a base station resource measurement and reporting program according to a mode of the invention wherein a capacity indication is sent from a base station node to a radio network controller node in a separate capacity message.

FIG. 5A and FIG. 5B show certain processes which are involved in the base station resource measurement and reporting program 100 in accordance with the two respective message modes. Since most of the operations/processes of the two message modes are similar, a description of the FIG. 5A embodiment is described as representative of the invention generally, with subsequent comment being provided for distinguishing the message modes of FIG. 5A and FIG. 5B.

FIG. 5A (and to some extent FIG. 3A) shows basic example operations involved with the base station resource measurement and reporting program 100 which executes on data processing and control unit 37 of base station (BS) node 28 in accordance with the first message mode of the invention. The basic operations comprising the example embodiment of base station resource measurement and reporting program 100 include node status process 5-1; RSI message generation process 5-2A; RSI message reporting requirement process 5-3; node resource tracking process 5-4; capacity assessment process 5-5; and, capacity indication reporting requirement process 5-7.

The node status process 5-1 serves to notify RSI message generation process 5-2 that a RSI message 102 should be generated. The events which prompt node status process 5-1 to serve its notification are listed in Third Generation Partnership Project (3GPP) Specification 25.433, section 8.2.15.2. Such events include, for example, a change in the capacity of base station (BS) node 28; start-up of a cell; or when a hardware failure occurs at the base station (BS) node 28.

When prompted by node status process 5-1, the RSI message generation process 5-2 generates the RSI message 102. The node status process 5-1 uses the model BS node 56 to prepare the RSI message 102. The model BS node 56 is a model which includes the total capacity of base station (BS) 28 in terms of "credits" and "Consumption Laws", stating the credit consumption for each spreading factor per radio link set separately for uplink (UP) and downlink (DL). Thus, a first purpose of the RSI message 102 of the present invention is essentially to transfer the model BS node 56 to the UTRAN management process in RNC 26, as depicted by the software object model BS node 56' in FIG. 3. Thus, in accordance with this first purpose, at least a portion of the format of the RSI message 102 is understood with reference to Third Generation Partnership Project (3GPP) Specification 25.433, section 9.1.31.

As mentioned above, the RSI message 102 is prepared in accordance with "Consumption Laws". A simplified illustrative example of utilization of the Consumption Laws for generating the RSI message 102 follows. For sake of simplified illustration, assume that base station (BS) node 28 has a certain capacity rating of 300 for its downlink transmissions (e.g., DL Capacity Credit=300) and a capacity rating of 500 for its uplink transmissions (e.g., UL Capacity Credit=500). Assume further that the spreading factor (SF) values available at base station (BS) node 28 are as follows: 4, 8, 16, 32, 64, 128, and 256; which is expressed as in the manner of Expression 1.

SF={4, 8, 16, 32, 64, 128, 256}    Expression 1

As is generally termed, the spreading factor SF is the processing gain, i.e., the ratio of transmission bandwidth and information bandwidth. The spreading factor or processing gain essentially determines the number of users that can be allowed in a system, the amount of multi-path effect reduction, the difficulty to jam or detect a signal etc. For spread spectrum systems it is advantageous to have a processing gain as high as possible.

Further assume, for the simplified illustration, that the downlink consumption law for base station (BS) node 28 (for both common channels and dedicated channels) is expressed by Expression 2, while the uplink consumption law for base station (BS) node 28 is expressed by Expression 3:

DL Cost={30, 20, 12, 8, 4, 2, 1}    Expression 2

UL Cost={16, 14, 12, 10, 8, 6, 4}    Expression 3

The information equivalent to that of Expression 2 and Expression 3 is included in the RSI message 102 sent from base station resource measurement and reporting program 100 of base station (BS) node 28 to radio network controller (RNC) node 26. Then, given the foregoing assumptions and upon receipt of the RSI message 102, the UTRAN management process 104 at radio network controller (RNC) node 26 and the base station resource measurement and reporting process 100 of base station 28 can independently calculate how much of base station (BS) node 28 is occupied. The base station (BS) 28 and the radio network controller (RNC) node 26 can independently calculate the occupancy of base station (BS) 28 by applying Expression 4.

$$L = \sum_{sf}^{all\ SF} N_{sf} \cdot C_{sf}$$    Expression 4

In Expression 4:
L=load/occupancy;
$N_{sf}$=number of allocations with spreading factor sf; and
$C_{sf}$=consumption for spreading factor sf according to reported consumption law.

The determination of load/occupancy (e.g., using Expression 4) is applied separately both on UL and DL. A comparison between the load L and the earlier reported 'credits' indicates the occupancy of the base station (BS) 28.

Thus, the calculation is performed by multiplying the actual allocated channels of each spreading factor (SF) by the cost defined for that spreading factor. Suppose, for example, that number of channels active for each of the possible spreading factors (listed in the "SF" row of Table 2) is as shown in the "channels" row of Table 2. The radio network controller (RNC) node 26, which controls channel allocation, knows the number of channels active for each spreading factor. Using the information supplied in RSI message 102, e.g., the "DL cost" row and "UL cost" row of Table 2, the UTRAN management process 104 can determine the total cost relative to each spreading factor for each link direction (shown in the "DL total cost" row of Table 2 and the "UL total cost" row of Table 2). Adding the total costs for all spreading factors for the downlink, UTRAN management process 104 obtains a value of 282, and in view of the capacity rating of 300 for its downlink transmissions for base station (BS) node 28, determines that the downlink hardware of base station (BS) node 28 is 94% occupied. Similarly, adding the total costs for all spreading factors for the uplink, UTRAN management process 104 obtains a value of 444, and in view of the capacity rating of 500 for the uplink transmissions, determines that the uplink hardware of base station (BS) node 28 is 89% occupied.

TABLE 2

| | SF | | | | | | |
|---|---|---|---|---|---|---|---|
| | 4 | 8 | 16 | 32 | 64 | 128 | 256 |
| Channels | 1 | 2 | 4 | 8 | 12 | 16 | 20 |
| DL cost | 30 | 20 | 12 | 8 | 4 | 2 | 1 |
| DL total cost | 30 | 40 | 48 | 64 | 48 | 32 | 20 |
| UL cost | 16 | 14 | 12 | 10 | 8 | 6 | 4 |
| UL total Cost | 16 | 28 | 48 | 80 | 96 | 96 | 80 |

The RSI message reporting requirement process 5-3 specifies how the RSI message 102 is to be reported and/or formatted. For example, the RSI message reporting requirement process 5-3 apprises RSI message generation process 5-2 whether the RSI message 102 is to report UL and DL values separately or in combination.

It will be recalled that, in the first message mode of the invention, the RSI message 102 additionally contains the capacity indication of the present invention. In this regard, using the resource tracking process 5-4, the base station resource measurement and reporting program 100 keeps track of the usage of each type of resource/device. As part of resource tracking process 5-4, the number ($N_{sf}$) of allocations in radio base station (RBS) 28 with spreading factor sf and the total number (N) of allocations in the radio base station (RBS) 28 are determined.

The capacity assessment process 5-5 ultimately determines the capacity of the radio base station (RBS) 28, and prepares the capacity indication 110. In this first message mode of the invention, the capacity indication calculated by the capacity assessment process 5-5 is included in the modified RSI message 102 as shown in FIG. 2A, FIG. 3A, and FIG. 5A. As described below, the capacity message report requirement process 5-7 specifies to some degree how the capacity indication 110 is to be formatted.

The capacity indication 110 can be provided to network controller (RNC) node 26 in diverse formats, as required by capacity indication report requirement process 5-7. In a first reporting mode of the invention, the capacity indication is actually a vacancy capacity value, indicating the number of connections that can be added for each spreading factor. In this first reporting mode of the invention, the capacity indication 110 includes a series of values $A_{sf}$, the values $A_{sf}$ indicating how many allocations/connections of each possible spreading factor (sf) can be added before reaching the capacity limit. In accordance with a second reporting mode of the invention, the capacity value transmitted by capacity indication 110 is a total capacity value which reflects both the existing load and vacancy capacity over all spreading factors. The first reporting mode and the second reporting mode can be applicable to both the first message mode and the second message mode.

In the first reporting mode of the invention, user or other input to the capacity indication report requirement process 5-7 can specify that the capacity indication 110 is to report how many connections can be added for one or more spreading factors (sf), considering the various types of resources/devices. In other words, the capacity indication report requirement process 5-7 determines for one or more spreading factors (sf) the amount of connections (i.e., number of allocations) that can be added. As further described with reference to FIG. 6, the capacity assessment process 5-5 uses the device models 54 to calculate how many allocations/connections ($A_{sf}$) of each possible spreading factor (sf) can be added before reaching the capacity limit. The capacity indication 110 includes a series of values $A_{sf}$, the values $A_{sf}$ indicating how many allocations/connections of each possible spreading factor (sf) can be added before reaching the capacity limit. Thus, in this first reporting mode the capacity indication 110 includes a vacancy capacity value for each spreading factor. The capacity indication 110 of this mode can be generated separately for uplink (UL) and downlink (DL), if the capacity indication report requirement process 5-7 so indicates.

In the second reporting mode of the invention, user or other input to the capacity indication report requirement process 5-7 can specify that the capacity indication 110 is to report a single value indicative of totally capacity of radio base station (RBS) 28. In this second reporting mode, capacity assessment process 5-5 determines the total capacity value (e.g., a capacity value for the uplink [UL] and a capacity value for the downlink [DL]), with one technique of doing so being described below.

Figure 6:
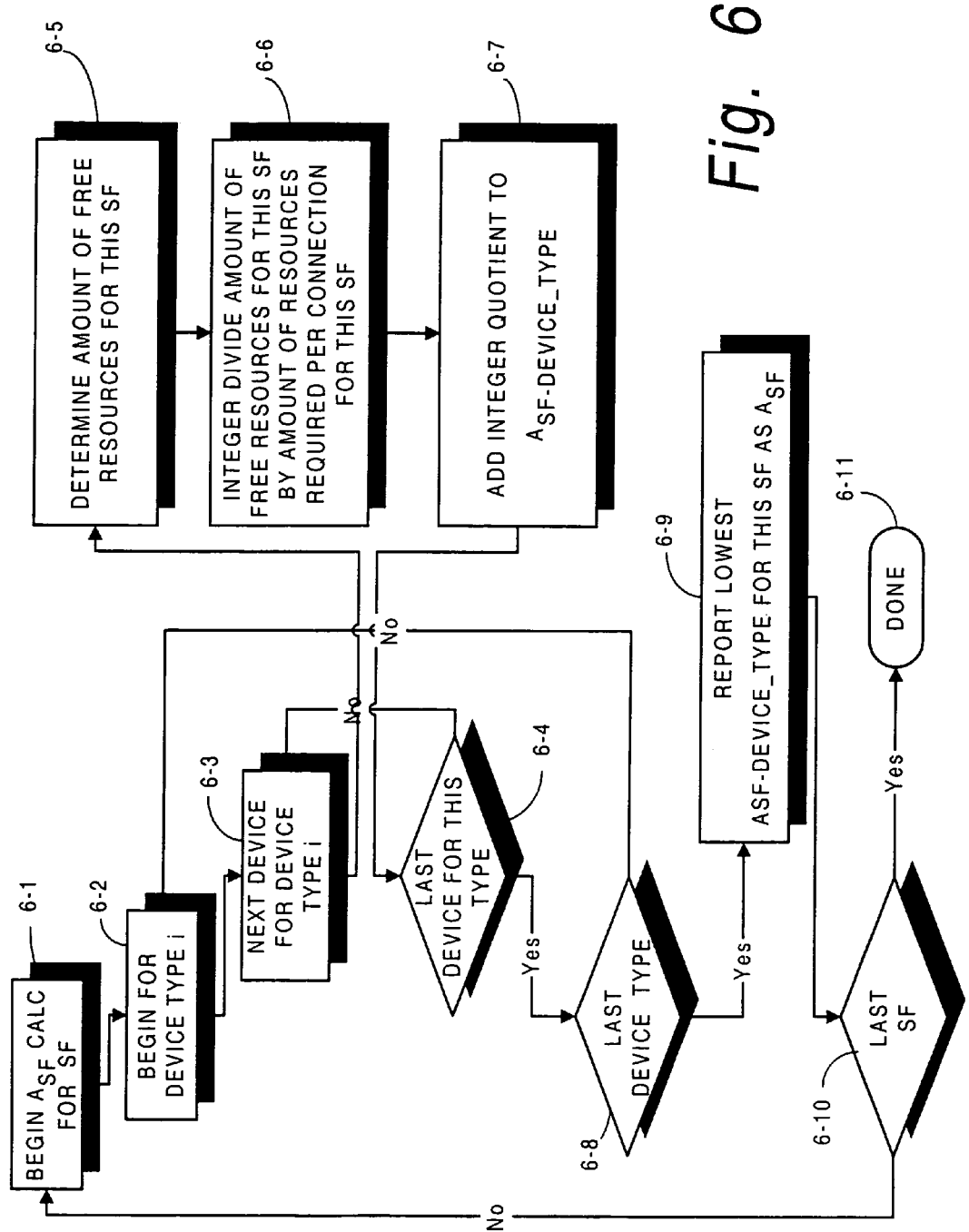
FIG. 6 is a flowchart showing certain events performed in connection with a node capacity assessment process.

In the second reporting mode, as in the first reporting mode, the capacity assessment process 5-5 uses the device models 54 to calculate how many allocations ($A_{sf}$) of each possible spreading factor (sf) can be added before reaching the capacity limit. Example logic for determining the allocations ($A_{sf}$) of each possible spreading factor (sf) that can be added is illustrated in FIG. 6 and described below. The different devices 50 may result in different amounts. The number that can be added is then the minimum of the numbers of the various devices. The capacity assessment process 5-5 thus initially provides an indication of how many connections of a spreading factor can be added if all added connections are of the same spreading factor.

Next, for the second reporting mode, the capacity assessment process 5-5 calculates the amount of free resources, expressed in terms of credits. One way of calculating the amount of free resources is provided by Expression 5:

$$F = \sum_{sf}^{all\ SF} W_{sf} \cdot A_{sf} \cdot C_{sf} \qquad \text{Expression 5}$$

In Expression 5:
F=free resources;
$W_{sf}$=a weighting factor for spreading factor sf;
$A_{sf}$=number of connections that can be added with spreading factor sf;
$C_{sf}$=consumption for spreading factor sf according to reported consumption law.

In one example embodiment, the weighting factor $W_{sf}$ for the spreading factors sf is equal the number of connections with that spreading factor as a fraction of all connections, i.e., Nsf/N, where $N_{sf}$ is the number of allocations in base station with spreading factor sf and N is the total number of allocations in the base station, so that for this weighting scheme Expression 5 can be rewritten as Expression 6:

$$F = \sum_{sf}^{all\ SF} \frac{N_{sf}}{N} \cdot A_{sf} \cdot C_{sf} \qquad \text{Expression 6}$$

A new capacity is than calculated by adding the load L and the free amount F, as shown in Expression 7:

$$Cap_{new} = L + F \qquad \text{Expression 7}$$

Since the evaluation of Expression 5 or Expression 7 depends upon the factors $A_{sf}$, the value ultimately transmitted by the capacity indication 110 in this second mode is said to be based on the determination of how many allocations/connections ($A_{sf}$) of each possible spreading factor (sf) can be added before reaching the capacity limit.

In one variation of the first message mode, the capacity indication report requirement process 5-7 can also authorize RSI message generator 5-2A to generate a RSI message 102 with the capacity indication 110 in accordance with various criteria, of which the following are examples: (1) the absolute difference between the newly calculated capacity and the most recently reported capacity is larger than a predetermined threshold; (2) the current load L is larger than a predetermined load threshold; (3) the time since the last update is larger than a predetermined time lapse threshold.

In the second message mode of the invention, illustrated with reference to FIG. 2B, FIG. 3B, and FIG. 5B, the capacity indication is the subject of a separate message which is sent from the base station (BS) node 28 to the radio controller (RNC) node 26, e.g., in a capacity message 112 which is separate and distinct from the RSI message 102. For this second message mode, the basic operations comprising the example embodiment of base station resource measurement and reporting program 100 include node status process 5-1; RSI message generation process 5-2B; RSI message reporting requirement process 5-3; node resource tracking process 5-4; capacity assessment process 5-5; capacity message generation process 5-6, and, capacity indication reporting requirement process 5-7.

As in the first message mode, the node status process 5-1 of the second message mode serves to notify RSI message generation process 5-2 that a RSI message 102 should be generated. When prompted by node status process 5-1, the RSI message generation process 5-2 generates the RSI message 102. The RSI message 102 of the second message mode is a conventional RSI message which does not additionally carry the capacity indication of the present invention. The node status process 5-1 uses the model BS node 56 to prepare the RSI message 102. Thus, the RSI message 102 essentially transfers the model BS node 56 to the UTRAN management process in RNC 26, as depicted by the software object model BS node 56' in FIG. 3B. The RSI message 102 is understood with reference to Third Generation Partnership Project (3GPP) Specification 25.433, section 9.1.31. The RSI message reporting requirement process 5-3 specifies how the RSI message 102 is to be reported and/or formatted. For example, the RSI message reporting requirement process 5-3 apprises RSI message generation process 5-2B whether the RSI message 102 is to report UL and DL values separately or in combination.

Also as in the first message mode, the resource tracking process 5-4 for the second message mode of the base station resource measurement and reporting program 100 keeps track of the usage of each type of resource/device. As part of resource tracking process 5-4, the number ($N_{sf}$) of allocations in radio base station (RBS) 28 with spreading factor sf and the total number (N) of allocations in the radio base station (RBS) 28 are determined.

The capacity assessment process 5-5 of the second message mode ultimately determines the capacity of the radio base station (RBS) 28, and prepares the capacity indication 110. Whether operating in the either the first reporting mode or the second reporting mode, the capacity assessment process 5-5 uses the device models 54 to calculate how many allocations ($A_{sf}$) of each possible spreading factor (sf) can be added before reaching the capacity limit, in the manner subsequently described with respect to FIG. 6. When operating in the second reporting mode, the capacity assessment process 5-5 proceeds to perform calculations to obtain a new capacity for the node, using calculations such as those in Expression 5, Expression 6 and Expression 7 discussed above.

Thus, in the second message mode of the invention, the capacity indication calculated by the capacity assessment process 5-5 is included in a separate capacity message, e.g., capacity message 112 illustrated in FIG. 2B, FIG. 3B, and FIG. 5B. The capacity message 112 is actually prepared by capacity message generator 5-6. The capacity message generator 5-6 generates the capacity message 110 when requested to do so by capacity message report requirement process 5-7. The capacity indication report requirement process 5-7 may authorize capacity message generator 5-6 to generate a capacity message 112 with the capacity indication 110 in accordance with various criteria, of which the following are examples: (1) the absolute difference between the newly calculated capacity and the most recently reported capacity is larger than a predetermined threshold; (2) the current load L is larger than a predetermined load threshold; (3) the time since the last update is larger than a predetermined time lapse threshold.

Thus, from the foregoing it will be appreciated that the separate capacity message 112 of the first message mode of the invention can be prepared in accordance with either the first reporting mode of the invention or the second reporting mode. In the first reporting mode, the capacity indication 110 of the capacity message 112 includes a series of values $A_{sf}$, the values $A_{sf}$ indicating how many allocations/connections of each possible spreading factor (sf) can be added before reaching the capacity limit. In accordance with the second reporting mode of the invention, the capacity value transmitted by capacity message 110 is a total capacity value which reflects both the existing load and vacancy capacity over all spreading factors.

FIG. 6 shows example logic which can be utilized for making an accurate calculation of the number of allocations/connections ($A_{sf}$) of each possible spreading factor (sf) can be added before reaching the capacity limit. The logic of FIG. 6 can be implemented by the capacity assessment function 5-5 of either the first message mode (FIG. 5A) or the second message mode (FIG. 5B). Further, the logic for the determination of the number of allocations/connections ($A_{sf}$) is utilized in both reporting modes, including as a preliminary determination in the second reporting mode prior to evaluating expressions such as Expression 5, Expression 6, and Expression 7 as above described.

Block 6-1 of FIG. 6 depicts beginning of the calculation, for a certain spreading factor, of the number of allocations/connections ($A_{sf}$) that can be added for that spreading factor before reaching the capacity limit. In actuality, block 6-1 is the first step of a spreading factor loop (comprising all but the last step 6-11 of FIG. 6) which is performed for each spreading factor applicable to the base station (BS) node 28.

The logic of FIG. 6 has two loops nested within the spreading factor loop. The first loop is a device type loop, which is initialized at step 6-2 and extends through step 6-8. For each spreading factor, the device type loop is executed for each device type of the base station (BS) node 28. Examples of certain device types are illustrated and previously discussed with reference to FIG. 4. The initialization of step 6-2 includes a zeroing of the sum $A_{sf-DEVICE\_TYPE}$.

The second loop nested within the spreading factor loop is the device number loop. The device number loop is initialized at step 6-3, and extends through step 6-7. The device number loop can be repetitive in a situation in which there is more than one of the same device types at the base station (BS) node 28. For example, there may be two DSOP devices at the base station (BS) node 28, in which case for the device type DSOP the device number loop will be executed twice.

The device number loop comprises steps 6-4 through 6-6, which are consecutively performed for each device. At step 6-4, a determination is made of the amount of free resources at the device for the spreading factor of concern for this iteration. In the sense of FIG. 6, "free resources" includes, for example, the available Mips for a processor or bytes in memory, as ascertained from the device models 54. Then, at step 6-5, an integer division is performed by dividing the amount of the free resources (as determined at step 6-4) by the amount of the resources required per connection by this device for the spreading factor of concern for this iteration. At step 6-6 the integer quotient of the division of step 6-5 is added to the sum $A_{sf}$-DEVICE$_{TYPE}$, which represents the number of connections/allocations which can be added for this device type for the spreading factor involved in the iteration.

After the sum $A_{sf\text{-}DEVICE\_TYPE}$ has been accumulated for all devices of the same device, the device type loop is executed (as indicated by the negative arrow leading from block 6-8 to block 6-2) for the next device type. After it is determined at step 6-8 that all device types for the spreading factor have been considered, at step 6-9 the lowest $A_{sf\text{-}DEVICE\_TYPE}$ sum for all device types is reported as the $A_{sf}$ for the spreading factor of concern for the iteration. Similar determinations are made for each spreading factor in use at the node by repeated executions of the spreading factor loop, until it is determined at step 6-10 that all spreading factors have been processed.

The logic of FIG. 6, including the integer division of step 6-5, gives a realistic assessment of how much usable capacity really exists at the devices of the node for each spreading factor. Such logic avoids the segmentation problem discussed above.

Thus, in the aforedescribed embodiments of the present invention, the device handler 52 has a detailed model 54 of each of the devices 52. Using these models 54, very accurate information is available regarding the load on the corresponding devices 52. Moreover, using the models 54 the base station resource measurement and reporting program 100 can calculate how many allocations of each spreading factor can be added before reaching a capacity limit.

In addition, the device handler 52 has a model 56 for the entire radio base station (RBS) 28. This base station node model 56 is the total capacity of the radio base station (RBS) 28 in terms of 'credits' and a consumption law, stating the 'credit consumption' for each SF per RLS separately for UL and DL. This model 56 is transferred to the radio network controller (RNC) 26 through certain fields of the standardized NBAP messages (RSI message 102). As it only considers the spreading factors (SF), the node model 56 is much less accurate than the internal device models 54.

The present invention therefore does not assume that resource usage depends only on the individual spreading factors (SFs), and does take into consideration the loss in efficiency through segmentation. Moreover, the present invention considers that several types of resources can be involved in a connection, with possible different characteristics to its use.

Figure 7:
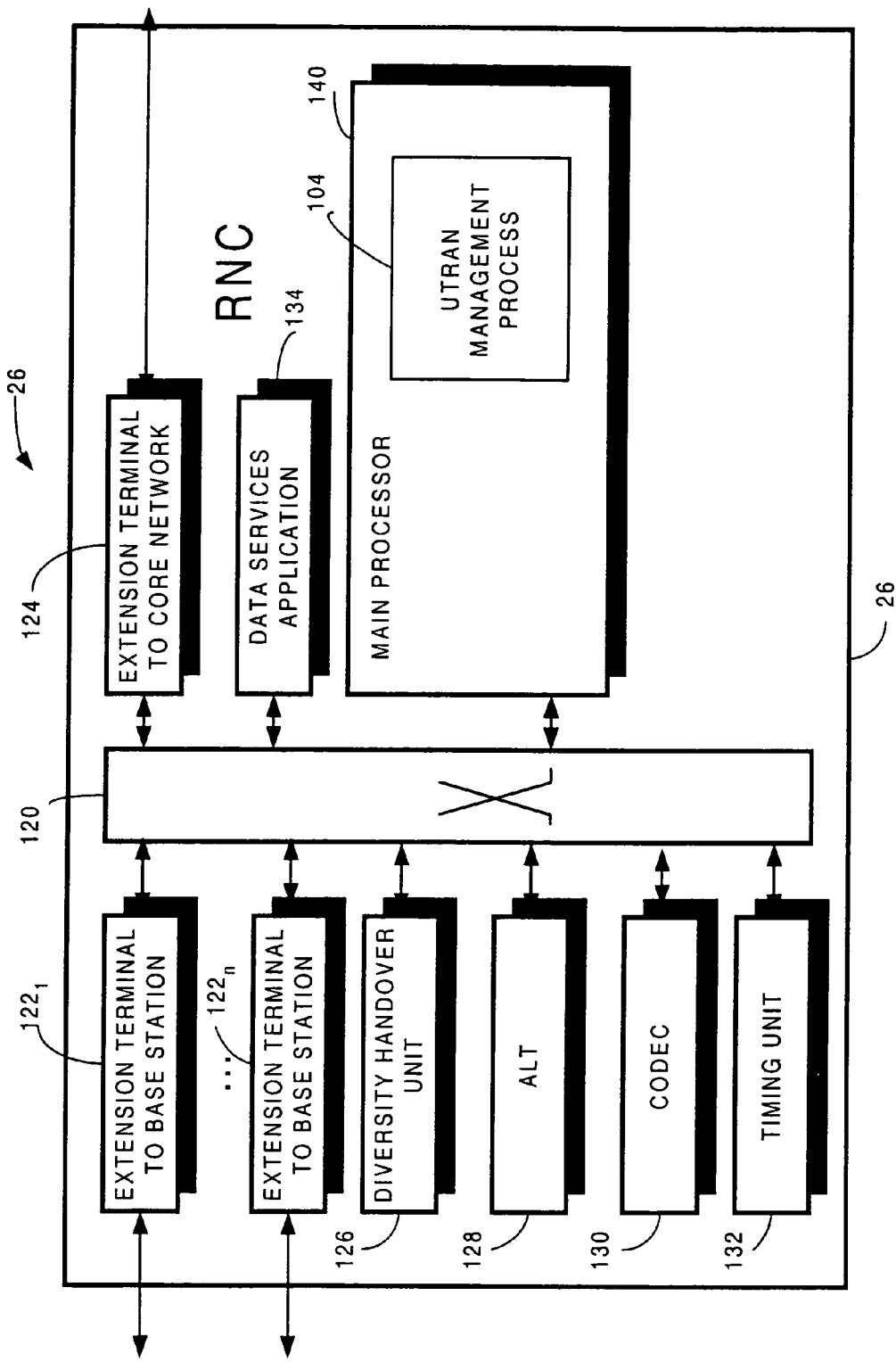
FIG. 7 is a schematic view of an example RNC node in accordance with one embodiment of the invention.
Figure 8:
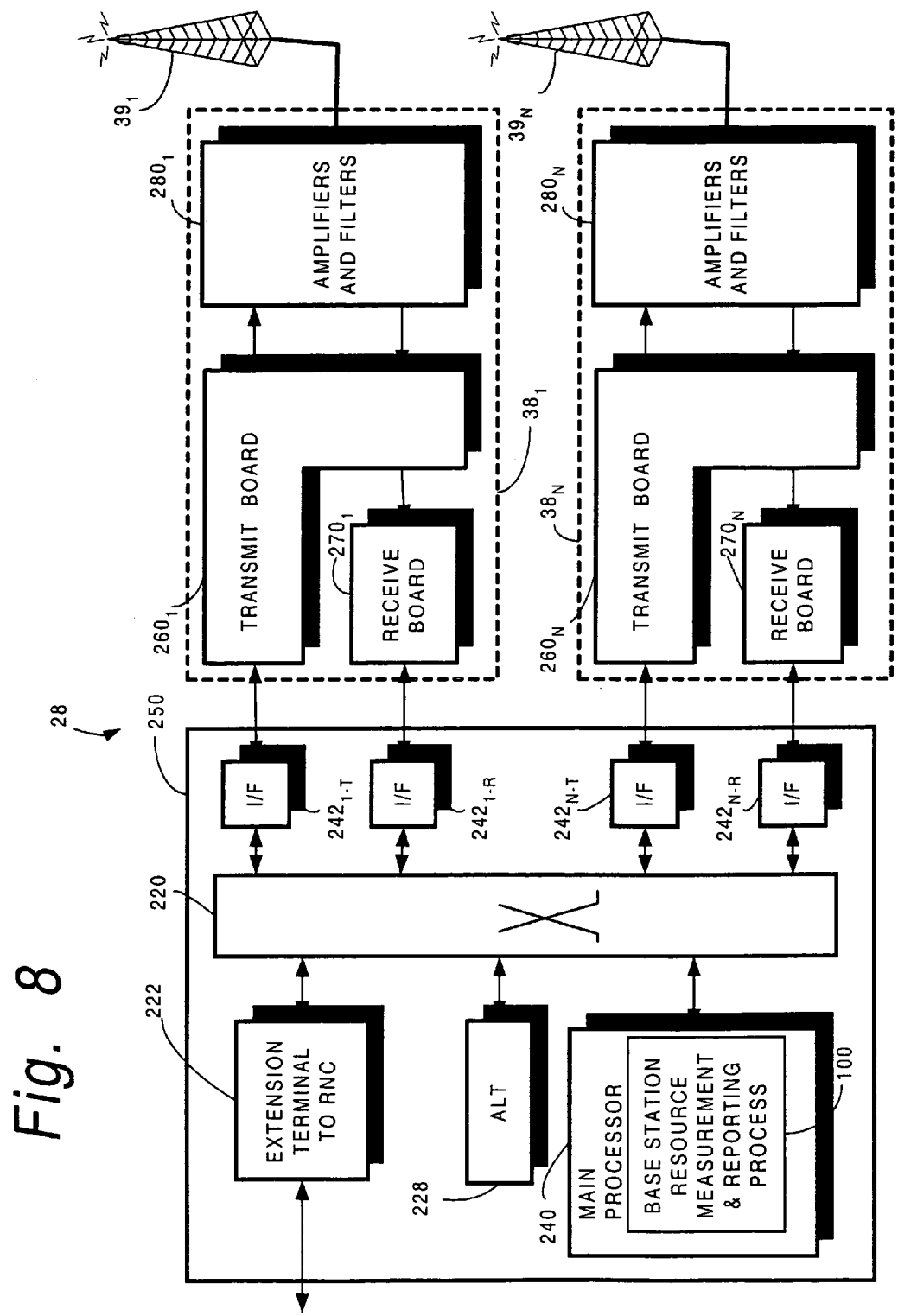
FIG. 8 is a schematic view of an example base station node in accordance with one embodiment of the invention.

Other more detailed illustrative examples of radio network controller (RNC) node 26 and base station (BS) node 28 with which the invention can suitably be employed are illustrated in FIG. 7 and FIG. 8, respectively. In this regard, FIG. 7 illustrates, in somewhat more detail, an example non-limiting RNC node 26 of the present invention. It so happens that the RNC node 26 of FIG. 8 is a switched-based node having a switch 120. The switch 120 serves to interconnect other constituent elements of RNC node 26. Such other constituent elements include extension terminals $122_1$ through $122n$, as well as extension terminal 124. Extension terminals $122_1$ through $122n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; an ALT unit 128; codex 130; timing unit 132; a data services application unit 134; and, a main processor 140. The person skilled in the art will appreciate generally the functions of these constituent elements, it being noted that the ALT unit 128 is a unit which provides, e.g., multiplexing and demultiplexing and (optionally) queuing with regard to differing protocols of cells.

FIG. 8 illustrates, in non-limiting manner, more details of an example base station (BS) node 28 in accordance with one embodiment of the present invention. As with RNC node 26, the base station (BS) node 28 of FIG. 8 is a switched-based node having a switch 220 which serves to interconnect other constituent elements of base station (BS) node 28. Such other constituent elements include extension terminal 222; ALT unit 228; BS main processor 240, and interface boards 242.

Extension terminal 222 connects base station (BS) node 28 to radio network controller (RNC) node 26, and thus comprises the Iub interface. As in the case of radio network controller (RNC) node 26, the ALT unit 228 is a unit which provides, e.g., multiplexing and demultiplexing and (optionally) queuing with regard to differing protocols of cells.

The embodiment of base station (BS) node 28 illustrated in FIG. 8 is housed in a rack having multiple subracks. Each subrack has one or more boards, e.g., circuit boards, mounted thereon. A first subrack 250 contains boards for each of extension terminal 222; ALT unit 228; BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board $242_{1\text{-}T}$ is connected to transmitter board $260_1$, while interface board $242_{1\text{-}R}$ is connected to receiver board $270_1$. The pair of transmitter board 260, and receiver board 270, is, in turn, connected to amplifiers and filters board $280_1$. Similar connections exist for a second pairing of transmitter board $260_2$ and receiver board $270_2$, which interface via interface board $242_{2\text{-}T}$ and interface board $242_{2\text{-}R}$, respectively. Each transceiver 38 of FIG. 2 thus comprises a subrack which includes a transmitter board 260, a receiver board 270, and amplifiers and filters board 280.

In one example embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver sources which it shares with receiver board 270, including a D/G transmitter and an radio frequency transmitter. Each receiver board 270 includes unillustrated elements such as an interface connected to its corresponding interface board 242; a decoder; a demodulator; and a baseband receiver. Each amplifiers and filters board 280 includes amplifiers, such as MCPA and LNA amplifiers.

In the example base station (BS) node 28 of FIG. 8, BS main processor 240 executes base station resource measurement and reporting program 100. For the example radio network controller (RNC) node 26 shown in FIG. 7, main processor 140 executes UTRAN management program 104.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while nodes of the present invention have been illustrated for sake of example as being ATM-based nodes, it should be understood that the invention is not so limited, and that other communication protocols and/or cell structures can be utilized for communicating on an inter-node and intra-node bases.

What is claimed is:

1. A base station node of a radio access network which determines a number of connections for each of plural spreading factors that can be added to the base station node, and which sends to a radio network controller (RNC) node a capacity indication including a capacity value based on the determined number of connections, wherein the capacity indication is a total capacity value calculated using a vacancy capacity value for each of plural spreading factors, wherein the capacity indication is determined at least in part using the following expression:

$$F = \sum_{sf}^{all\ SF} W_{sf} \cdot A_{sf} \cdot C_{sf}$$

wherein:
F=free resources;
$W_{sf}$=a weighting factor for spreading factor sf;
$A_{sf}$=number of connections that can be added with spreading factor sf;
$C_{sf}$=consumption for spreading factor sf according to a reported consumption law.

2. A base station node of a radio access network which determines a number of connections for each of plural spreading factors that can be added to the base station node, and which sends to a radio network controller (RNC) node a capacity indication including a capacity value based on the determined number of connections, wherein the capacity indication is a total capacity value calculated using a vacancy capacity value for each of plural spreading factors, wherein the capacity indication is determined at least in part using the following expression;

$$F = \sum_{sf}^{all\ SF} \frac{N_{sf}}{N} \cdot A_{sf} \cdot C_{sf}$$

wherein:
F=free resources;
$N_{sf}$=a number of allocations in the base station node with spreading factor sf:
N=a total number of allocations in the base station node;
$A_{sf}$=number of connections that can be added with spreading factor sf;
$C_{sf}$=consumption for the spreading factor sf according to a reported consumption law.

3. A base station node of a radio access network which determines a number of connections for each of plural spreading factors that can be added to the base station node, and which sends to a radio network controller (RNC) node a capacity indication including a capacity value based on the determined number of connections, wherein the capacity indication is a total capacity value calculated using a vacancy capacity value for each of plural spreading factors, wherein the capacity indication $Cap_{new}$ determined using the following expression:

$$Cap_{new}=L+F$$

wherein:
F=free resources;
L=current load of the base station node.

4. A base station node of a radio access network which determines a number of connections for each of plural spreading factors that can be added to the base station node, and which sends to a radio network controller (RNC) node a capacity indication including a capacity value based on the determined number of connections, wherein the capacity indication includes a vacancy capacity value for each of plural spreading factors, wherein the capacity indication reports the determined number based on a combination of free connections for each of plural spreading factors, and using consumption laws appropriate for each of the spreading factors, and wherein the combination is a weighted combination.

5. The apparatus of claim 1, 2, 3, or 4, wherein the base station tracks usage of base station resources for determining the number of connections that can be added to the base station node.

6. The apparatus of claim 1, 2, 3, or 4 wherein the capacity indication reports the determined number for a particular spreading factor utilized at the base station node.

7. The apparatus of claim 1, 2, 3, or 4 wherein the capacity indication reports the determined number separately for uplink transmissions and downlink transmissions relative to the base station node.

8. The apparatus of claim 1, 2, 3, or 4, wherein the capacity indication is included in one of the following:
a 3GPP "Resource Status Indication" message;
a message which is distinct from a 3GPP "Resource Status Indication" message, and
its own dedicated message.

9. The apparatus of claim 1, 2, 3, or 4, wherein the base station node has plural devices, and wherein the capacity determination is based on a number of free resources per device.

10. A method of operating a radio access network, the method comprising:
determining, for each of plural spreading factors, a number of connections that can be added to a base station node: and
sending a capacity indication to a radio network controller (RNC) node, the capacity indication including capacity value which is based on the determined number of connections:
including in the capacity indication a total capacity value calculated using a vacancy capacity value for each of plural spreading factors, wherein the capacity value is determined at least in part using the following expression:

$$F = \sum_{sf}^{all\ SF} W_{sf} \cdot A_{sf} \cdot C_{sf}$$

wherein:
F=free resources;
$W_{sf}$=a weighting factor for spreading factor sf;
$A_{sf}$=number of connections that can be added with spreading factor sf;

$C_{sf}$=consumption for spreading factor sf according to a reported consumption law.

11. A method of operating a radio access network the method comprising:

determining, for each of plural spreading factors, a number of connections that can be added to a base station node; and sending a capacity indication to a radio network controller (RNC) node, the capacity indication including a capacity value which is based on the determined number of connections;

including in the capacity indication a total capacity value calculated using a vacancy capacity value for each of plural spreading factors, wherein the capacity value is determined at least in part using the following expression:

$$F = \sum_{sf}^{all\,SF} \frac{N_{sf}}{N} \cdot A_{sf} \cdot C_{sf}$$

wherein:
F=free resources;
$N_{sf}$=a number of allocations in the base station node with spreading factor sf;
N=a total number of allocations in the base station node:
$A_{sf}$=number of connections that can be added with spreading factor sf;
Csf=consumption for the spreading factor sf according to a reported consumption law.

12. A method of operating a radio access network, the method comprising:

determining, for each of plural spreading factors, a number of connections that can be added to a base station node; and sending a capacity indication to a radio network controller (RNC) node, the capacity indication including a capacity value which is based on the determined number of connections;

including in the capacity indication a total capacity value calculated using a vacancy capacity value for each of plural spreading factors, wherein the capacity value $Cap_{new}$ determined using the following expression;

$Cap_{new}$=L+F
wherein:
F=free resources;
L=current load of the base station node.

13. A method of operating a radio access network, the method comprising:

determining, for each of plural spreading factors, a number of connections that can be added to a base station node; and sending a capacity indication to a radio network controller (RNC) node, the capacity indication including a capacity value which is based on the determined number of connections;

including in the capacity indication as the capacity value a vacancy capacity value for each of plural spreading factors, wherein the capacity indication reports the determined number based on a combination of free connections for each of plural spreading factors, and using consumption laws appropriate for each of the spreading factors; and wherein the combination is a weighted combination.

14. The method of claim 10, 11, 12, or 13, further comprising tracking at the base station tracks usage of base station resources for determining the number of connections that can be added to the base station node.

15. The method of claim 10, 11, 12, or 13, wherein the capacity indication reports the determined number for a particular spreading factor utilized at the base station node.

16. The method of claim 10, 11, 12, or 13, wherein the capacity indication reports the determined number separately for uplink transmissions and downlink transmissions relative to the base station node.

17. The method of claim 10, 11, 12, or 13, further comprising including the capacity indication in one of the following;
a 3GPP "Resource Status Indication" message;
a message which is distinct from a 3GPP "Resource Status Indication" message; and
its own dedicated message.

18. The method of claim 10, 11, 12, or 13, wherein the base station node has plural devices, and wherein the capacity determination is based on a number of free resources per device.

19. A radio access network for comprising:
a radio network controller (RNC) node;
a base station node connected to the radio network controller (RNC) node, the base station node determining a number of connections for each of plural spreading factors that can be added to the base station node, and which sends to a radio network controller (RNC) node a capacity indication including a capacity value based on the determined number of connections, wherein the capacity value included in the capacity indication is a total capacity value calculated using a vacancy capacity value for each of plural spreading factors,
wherein the capacity value is determined at least in part using the following expression:

$$F = \sum_{sf}^{all\,SF} W_{sf} \cdot A_{sf} \cdot C_{sf}$$

wherein:
F=free resources;
$W_{sf}$=a weighting factor for spreading factor sf;
$A_{sf}$=number of connections that can be added with spreading factor sf;
$C_{sf}$=consumption for spreading factor sf according to a reported consumption law.

20. A radio access network for comprising:
a radio network controller (RNC) node; a base station node connected to the radio network controller (RNC) node, the
base station node determining a number of connections for each of plural spreading factors that can be added to the base station node, and which sends to a radio network controller (RNC) node a capacity indication including a capacity value based on the determined number of connections, wherein the capacity value included in the capacity indication is a total capacity value calculated using a vacancy capacity value for each of plural spreading factors, wherein the capacity value is determined at least in part using the following expression:

$$F = \sum_{sf}^{all\ SF} \frac{N_{sf}}{N} \cdot A_{sf} \cdot C_{sf}$$

wherein:
F=free resources;
$N_{sf}$=a number of allocations in the base station node with spreading factor sf;
N=a total number of allocations in the base station node:
$A_{sf}$=number of connections that can be added with spreading factor sf;
$C_{sf}$=consumption for the spreading factor sf according to a reported consumption law.

21. A radio access network for comprising
a radio network controller (RNC) node;
a base station node connected to the radio network controller (RNC) node, the base station node determining a number of connections for each of plural spreading factors that can be added to the base station node, and which sends to a radio network controller (RNC) node a capacity indication including a capacity value based on the determined number of connections, wherein the capacity value included in the capacity indication is a total capacity value calculated using a vacancy capacity value for each of plural spreading factors, wherein the capacity value $Cap_{new}$ is determined using the following expression:

$Cap_{new}=L+F$ wherein:
F=free resources;
L=current load of the base station node.

22. A radio access network for comprising: a radio network controller (RNC) node;
a base station node connected to the radio network controller (RNC) node, the base station node determination number of connections for each of plural spreading factors that can be added to the base station node, and which sends to a radio network controller (RNC) node a capacity indication including a capacity value based on the determined number of connections, wherein the capacity value included in the capacity indication includes a vacancy capacity value for each of plural spreading factors;
wherein the capacity indication reports the determined number based on a combination of free connections for each of plural spreading factors, and using consumption laws appropriate for each of the spreading factors; and
wherein the combination is a weighted combination.

* * * * *